(No Model.) 6 Sheets—Sheet 1.

C. COLAHAN.
GRAIN BINDER.

No. 315,479. Patented Apr. 14, 1885.

Witnesses.

Inventor.

(No Model.) 6 Sheets—Sheet 2.
C. COLAHAN.
GRAIN BINDER.

No. 315,479. Patented Apr. 14, 1885.

Witnesses, Inventor.

(No Model.) 6 Sheets—Sheet 3.
C. COLAHAN.
GRAIN BINDER.

No. 315,479. Patented Apr. 14, 1885.

Witnesses. Inventor.

(No Model.) 6 Sheets—Sheet 4.
C. COLAHAN.
GRAIN BINDER.
No. 315,479. Patented Apr. 14, 1885.
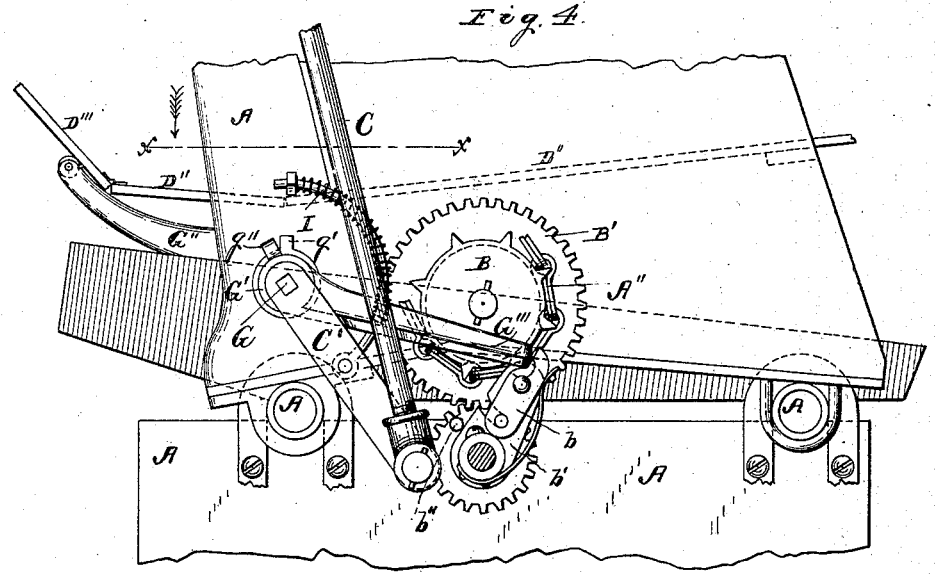
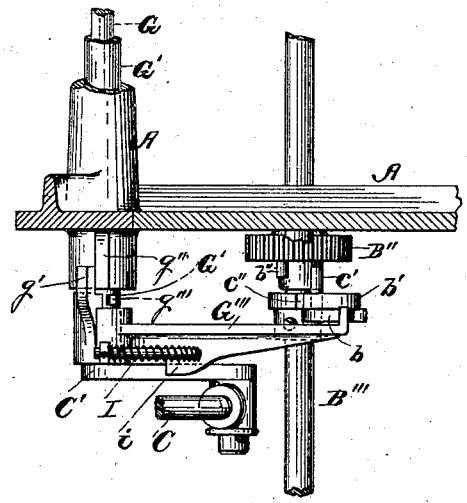
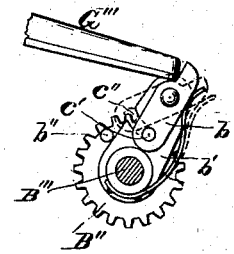
Witnesses. Inventor.

(No Model.)
C. COLAHAN.
GRAIN BINDER.
No. 315,479. Patented Apr. 14, 1885.
6 Sheets—Sheet 5.
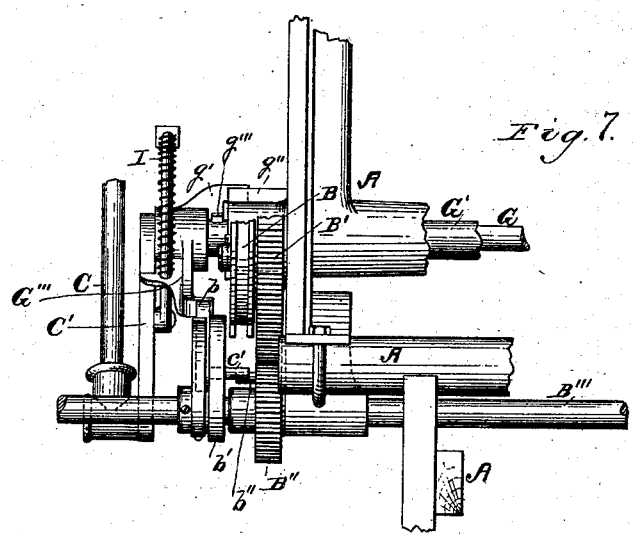
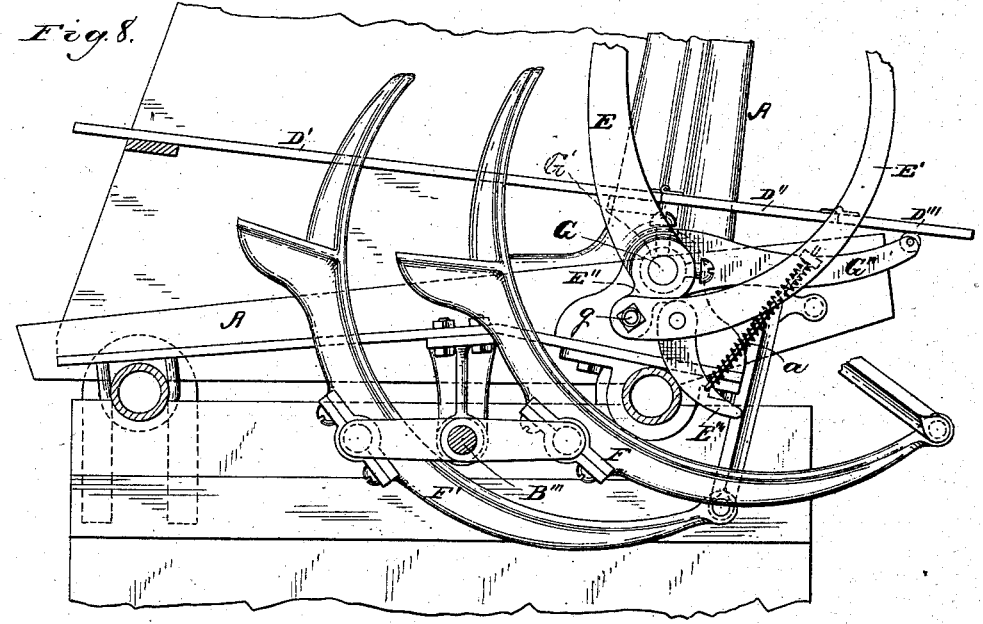
Witnesses.
Henry Frankfurter,
Frank Melen
Inventor.
Chas. Colahan

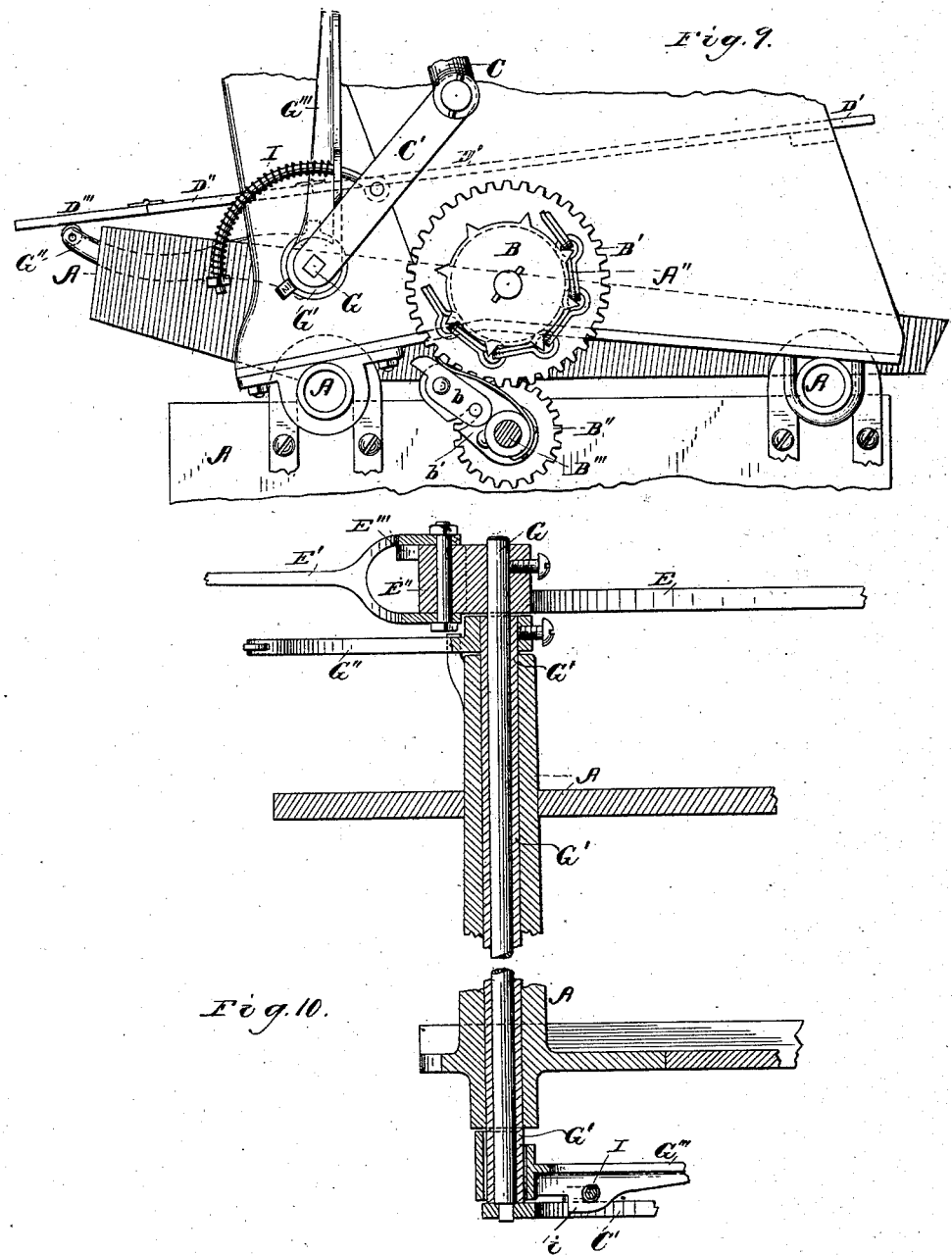

UNITED STATES PATENT OFFICE.

CHARLES COLAHAN, OF CLEVELAND, OHIO.

GRAIN-BINDER.

SPECIFICATION forming part of Letters Patent No. 315,479, dated April 14, 1885.

Application filed July 11, 1883. (No model.)

*To all whom it may concern:*

Be it known that I, CHARLES COLAHAN, of Cleveland, Ohio, have invented certain new and useful Improvements in Grain-Binders, of which the following is a specification.

My invention relates to that class of automatic grain-binders, which are attached to the side of the harvester, and receive the grain therefrom by means of packers which aid in gathering and straightening the grain in the receiver preparatory to the compressing action of the binder-arm and the compressor, which, when a certain quantity of straw is forced and uniformly condensed into the receiver, are brought into action, compress the bundle, and place the band around the sheaf, and in which the band-securing devices are brought into action at the proper time to tie the band, and thus securely bind the grain into compact sheaves.

My invention consists in the attachment of an upper and a lower leaf or plate to the receiver, by means of which and the compressor and binder-arm the grain may be uniformly compressed from the top and bottom preparatory to the binding.

Figure 1:
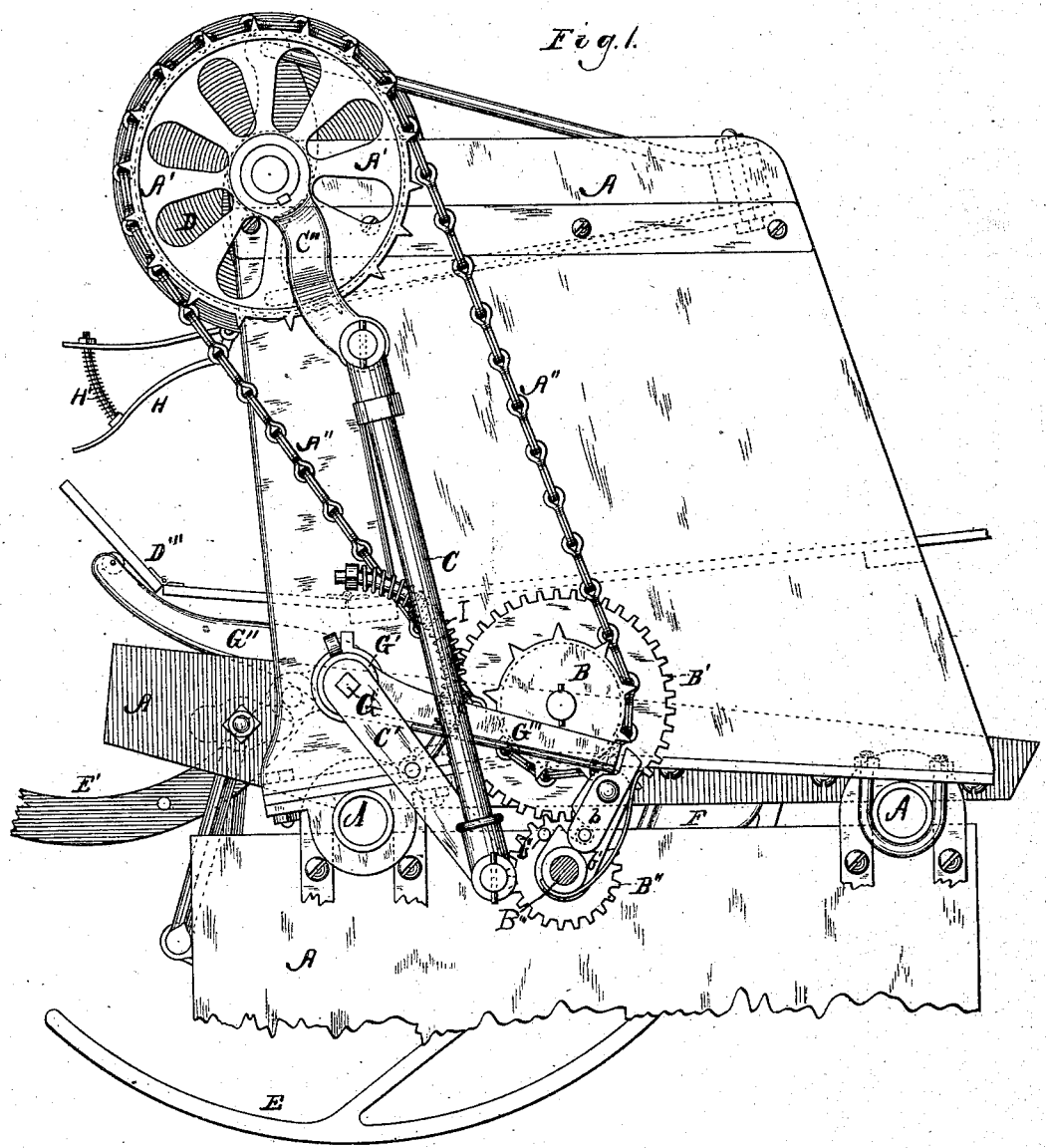
Figure 2:
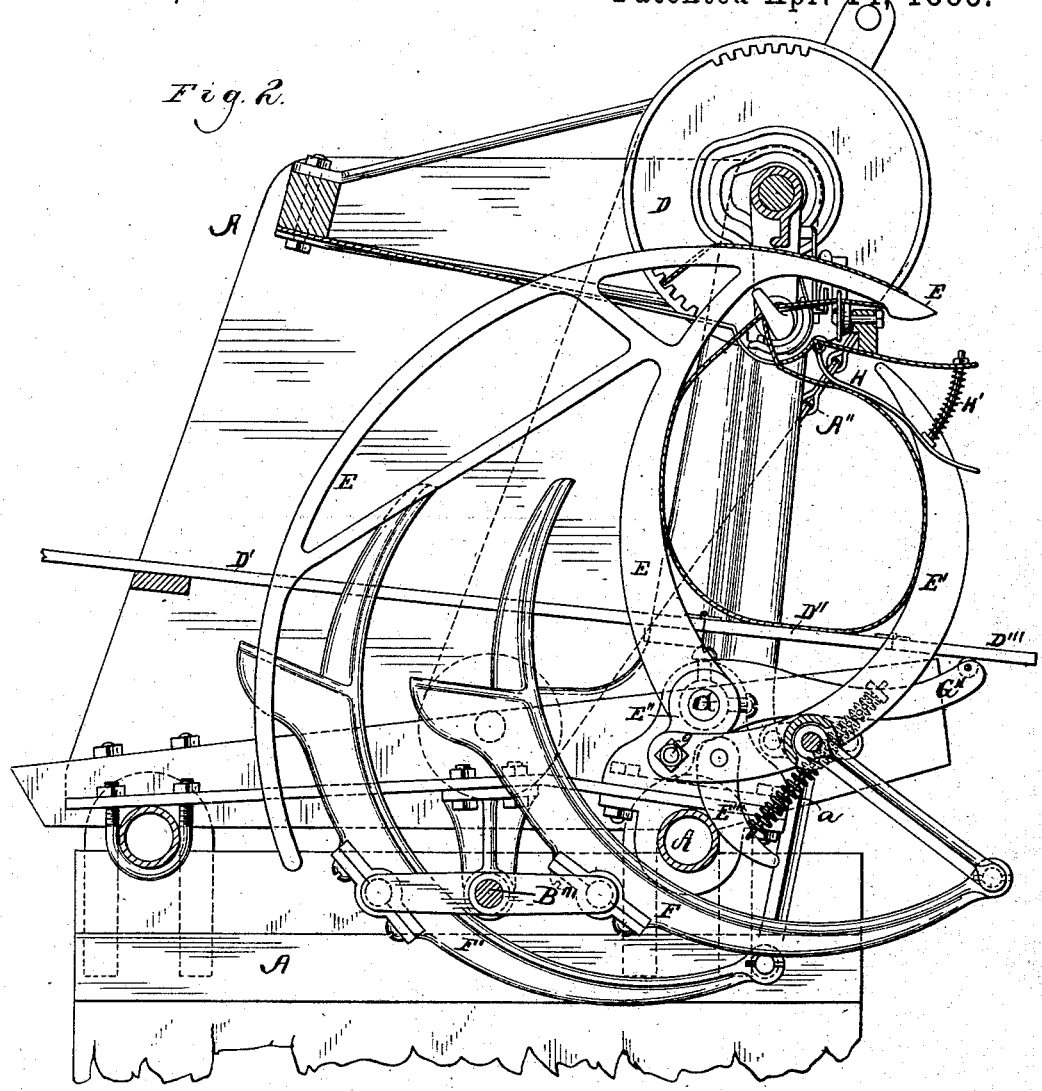
Figure 3:
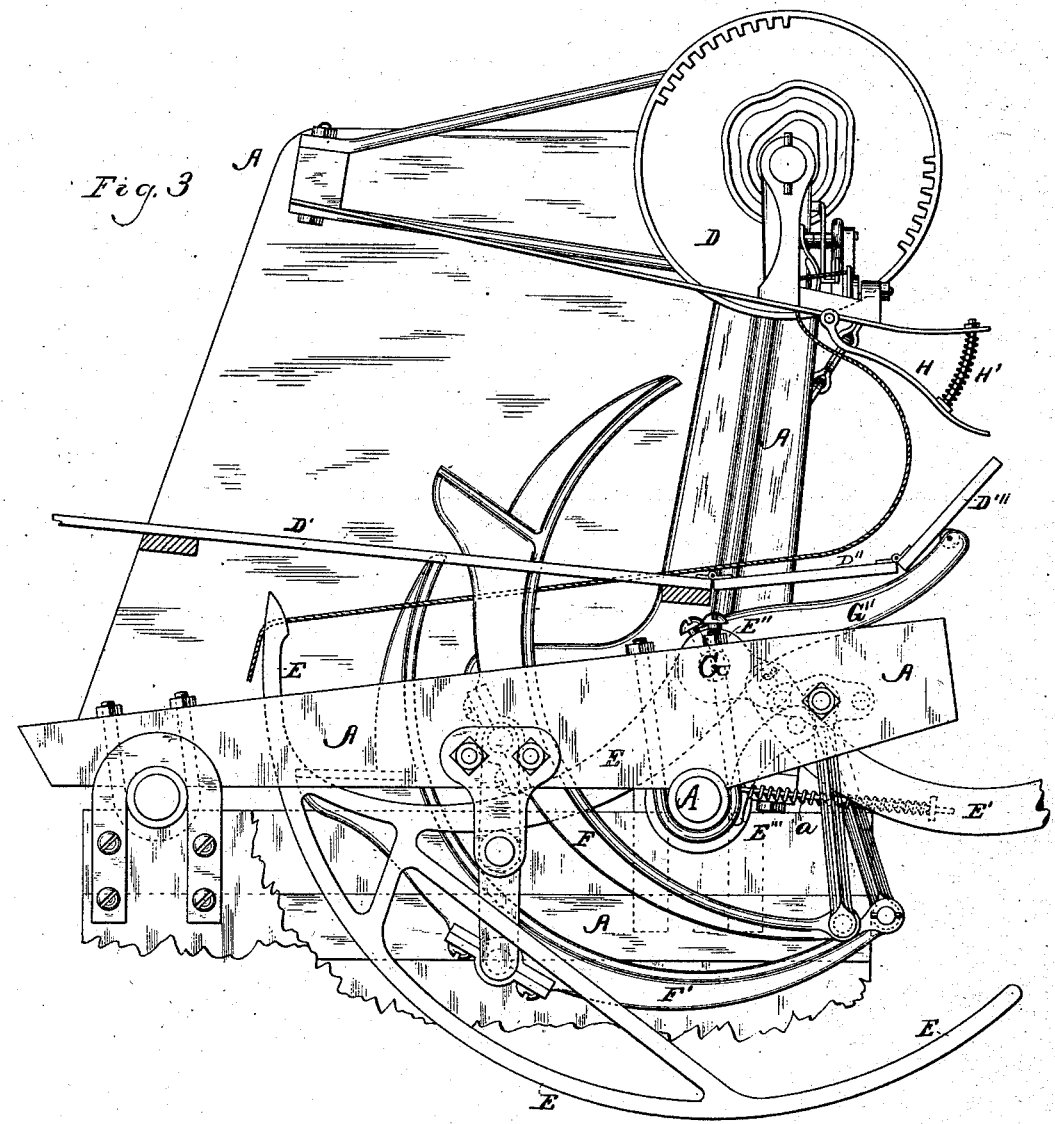

The accompanying drawings and description will more fully illustrate the invention. Figure 1 is a front end view of a machine containing the invention. Fig. 2 is a section through the frame, looking against the working parts in position for binding a bundle. Fig. 3 is an elevation showing the inside parts in position for receiving a gavel for binding. Fig. 4 is an end view showing a part of the tripping mechanism. Fig. 5 is a top view on line $x\ x$ of Fig. 4. Fig. 6 is a detailed view of the clutch-pawl and its continuously-revolving plate, which is secured to shaft B'''. Fig. 7 is a front sectional view showing the operative part of the clutching device at the outer end. Fig. 8 shows the compressor and binder-arm raised while in process of forming a bundle, and Fig. 9 is an end view of same. Fig. 10 is a sectional view of the binder-arm, the compressor, and their shaft, also of the trip-arm and its hollow shaft.

A is the frame. A' is the wheel for operating the binder-arm and tying mechanism. A'' is the power-belt thereof. B is a sprocket-wheel for operating said belt; B', a spur-gear on the same shaft with said sprocket-wheel; B'', the driving-pinion, and B''' the shaft thereof operated by the harvester. The wheel B'' is loose on said shaft, and by means of a pawl, $b$, on a plate, $b'$, secured to said shaft, and lug $b''$ on the wheel, is clutched to the shaft to operate the binding mechanism at the proper time, as will appear presently. C is a pitman-rod which operates the binder-arm; C', the crank connecting the pitman with the rock-shaft of said arm, and C'' the crank connecting the pitman with the shaft of wheel A'. D is the wheel on the same shaft which operates the tying mechanism, and D' the slotted receiving-table. E is the binder-arm; E', the compressing-arm; E'', the heel of the binder-arm, and E''' a pivoted spring-arm on the compressing-arm. F F' are the packers, which operate through slots in the receiving-table. G is the rock-shaft of the binder-arm; G', a tubular shaft or sleeve through which said rock-shaft passes; G'', an arm on said tubular shaft, projecting up against the receiving-table, and G''' a tripping arm or lever on said tubular shaft, projecting in the opposite direction. H is the upper yielding leaf or plate of the receiver, and H' a yielding spring bearing against said upper leaf or plate. The hinged portion D'' D''' of the table D', immediately below said upper surface constitutes the lower yielding leaf or plate, D'' D''', as shown in Fig. 4. I is a spring encircling a curved rod. The lower end of this spring rests on the tripping-arm, while the upper end is secured on the rod by a nut or head on said rod.

G' is the tubular tripping-shaft, which is actuated by arm G'', to cause the clutching and unclutching of the binder mechanism. The tripping-arm G''' is loosely fitted on said shaft G'. $g'$ is a lug cast on said arm G''', and $g''$ a corresponding lug cast on the main binder-frame A. Said projections or lugs $g'\ g''$ serve to limit the downward movements of the arm G'''.

$g'''$ is a projection or lug on the tripping-shaft G'. Said projection or lug has a free movement in a slot on the inner side of arm G''', and when rocked upward will carry the arm G''' with it, and when the binder-arm crank C' rises against the projection $i$ it will cause the tripping-arm G''' to rise, Fig. 9, and the curved rod I and its spring resting on projection *i* will cause it to descend on the return movement. *c'* and *b''* are clutch-pins, the pin *c'* being secured on the pawl *b*, which pawl *b* is pivoted to the plate *b'*, and when the arm G''' is held in the line of the path of travel, so as to be brought in contact with said pawl *b*, the pin *c'* will rise in the slot *c''* at each successive revolution of the continuously-revolving plate *b'*, which is secured on shaft B,''' (see Figs. 4, 5, and 6,) and when said arm G''' is raised from contact with pawl *b* the clutch-pins *b'' c'* will be brought into contact, and thus clutch and start the binder.

When the binder is in the position shown in Fig. 3, the binding mechanism is at rest, and the spring I, pressing down on the tripping-arm, holds up the arm G'', which supports the lower yielding leaf or plate of the receiver in the elevated position there seen, and as the grain is forced in between the upper and lower yielding leaves or plates it is somewhat compressed thereby until the quantity desired for a bundle is accumulated. At this point the lower leaf or plate will have been pressed down by the charge sufficiently to raise the outer end of the tripping-arm beyond the reach of the pawl, which is thereby released. When the pawl is released from the tripping-arm, the lug or pin C on the plate *b'* engages with lug *b''* on the wheel B'', and thereby the binder is set in motion and the parts are brought into the position shown in Fig. 2. When the bound bundle is discharged, the spring I will press down the tripping-arm to engagement with the pawl, which when so engaged causes the plate *b* to pass said lug and allow the wheel to remain at rest, though its shaft continue in operation. The pressing down of the tripping-arm also raises arm G'' and elevates the lower yielding leaf or plate to its former position to receive another gavel for binding.

The springs H', I, and *a* are all made adjustable in length by means of screws, so that the pressure or resistance of the parts to which they are attached may be regulated as desired. The receiving-table is sufficiently inclined to allow the grain or bundle to slide off when the lower end is let down, as seen in Fig. 2, and the bundle is discharged on the backward movement of the compressor E', which arm supports and compresses the bundle against the binder-arm while being bound.

I do not claim, broadly, the receiving-table, in combination with an arm for supporting the grain while being bound, and from which it is discharged when bound, as this is shown in Patent No. 98,910, granted to W. G. Beels, January 18, 1870.

In my binder the arm E' is pivoted to the heel of the binder-arm at *g* on heel E'' of binder-arm, which point moves backward as the shaft G, which carries the binder-arm, is rocked forward, so that the spring-arm E''', which rests against the frame A, will fold the arm E' toward the binder-arm by this movement, and said arm E' comes against, supports, and compresses the bundle on the side opposite the binder-arm simultaneously therewith, the spring *a* allowing arm E' to yield, as against the binder-arm, in case the bundle should be too large to allow it to go home.

What I claim is—

1. In a grain-binder, the binding-receptacle provided with an upper and a lower leaf or plate adapted to yield, the one above and the other below, by the increasing bulk of the inflowing grain, whereby the grain in the formation of the bundle is equally compressed by the receiver on opposite sides, substantially as shown.

2. In a grain-binder, the binding-receptacle provided with an upper and a lower leaf or plate capable of expansion above and below by the increasing bulk of inflowing grain, in combination with the binder-arm and a compressor-arm, the latter arranged to support and compress the bundle while being bound on the side opposite from the binder-arm, whereby the grain is compressed on four sides in forming the bundle, substantially as shown.

3. In a grain-binder, the combination of the lower yielding surface provided with the plates D'' D''', resting on the arm G'', with its tubular shaft G' and its tripping-arm G''', and the clutching-pawl *b*, its plate *b'*, pinion B'', clutch-pins *b'' c'*, and the continuously-revolving shaft B''', operating substantially as shown, and for the purpose described.

4. In a grain-binder, the yielding adjustable plate H, combined with and placed on the opposite side of the binding-receptacle from the yielding plates D'' D''', which are supported by the tripping-lever G, whereby the space between said plates may be so regulated that the tripping pressure will be given by a greater or less quantity of grain, substantially as shown.

5. The combination of the packing devices, the tripping-arm G'', supporting the yielding plates D'' D''', the rock-shaft G', and the clutching-arm G''', as shown and described.

6. In a grain-binder, a compressing-arm, E', hinged to the heel of the binder-arm at a point projecting from its rock-shaft, and having a movable yielding fulcrum on the frame or a stationary part of the machine, substantially as shown.

7. In a grain-binder, a compressing-arm, E', hinged to the heel of the binder-arm at a point projecting from its rock-shaft and fulcrumed on the frame or a stationary part of the machine, in combination with the yielding plates D'' D''', the tripping devices, and the packers, operating as and for the purposes substantially as shown.

8. In a grain-binder, the compressing-arm E', supported upon and actuated by the heel of the binder-arm E, and provided with the spring-arm E''', substantially as shown.

9. In a grain-binding machine, the binding-receptacle having the yielding plates D″ D‴ and capable of yielding in opposite directions by the pressure of the increasing bulk of the inflowing grain, in combination with the packers F F′, substantially as shown.

10. In a grain-binder, a yielding table, D″ D‴, supported on a pivoted arm, G″, in combination with its shaft G′, pivoted trip-arm G‴, and a clutching device consisting of a continuously-revolving plate, b′, having clutch-pin c′, provided with a pawl, b, and a lug, b″, on a pinion, B″, which is loose on its shaft B‴, constructed and operating substantially as and for the purpose shown.

11. In a grain-binder, an automatic tripping device consisting of the rock-shaft G′, its actuating-arm G″, the tripping-arm G‴, pivoted loosely thereon, the projection or lug g‴ on said rock-shaft, in combination with the clutching device or plate b′, pawl b, its clutch-pin c′, pinion B″, and lug b″, substantially as shown.

12. In an automatic grain-binder, the combination of the shaft B‴, its loose pinion B″, lug or pin b″, the plate b′, secured on said shaft, its pivoted pawl b, clutch-pin c′, and tripping-arm G‴, operating substantially as shown.

CHAS. COLAHAN.

Witnesses:
 JNO. H. WHIPPLE,
 J. W. MERRIAM.